J. DONOGHUE.
TOOL HANDLE.
APPLICATION FILED MAR. 29, 1911.

1,035,427.

Patented Aug. 13, 1912.

Witnesses

Inventor
James Donoghue.
by Bonnhardt & Co
Attorneys

UNITED STATES PATENT OFFICE.

JAMES DONOGHUE, OF CLEVELAND, OHIO.

TOOL-HANDLE.

1,035,427.  Specification of Letters Patent.  Patented Aug. 13, 1912.

Application filed March 29, 1911. Serial No. 617,781.

*To all whom it may concern:*

Be it known that I, JAMES DONOGHUE, citizen of the United States, residing at Cleveland, in the county of Cuyahoga and State of Ohio, have invented certain new and useful Improvements in Tool-Handles, of which the following is a specification.

This invention relates to tool handles, and methods of attaching the same to the tools, and has for its object to provide an improved method of attaching the handles, to the tangs of such tools as soldering irons or pokers.

The method embodies the attachment of a handle by burning the tang into place, in a bore formed in the handle. Said bore is provided with one or more vents to permit the escape of smoke and gases incident to the burning operation.

The invention is illustrated in the accompanying drawing in which—

Figure 1:
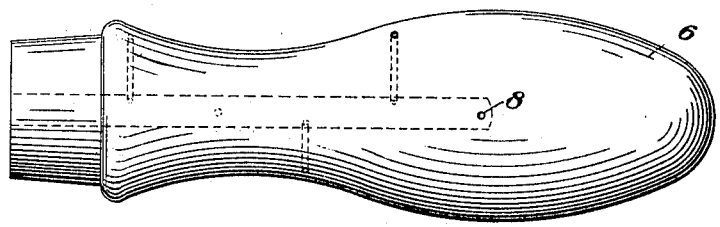
Figure 2:
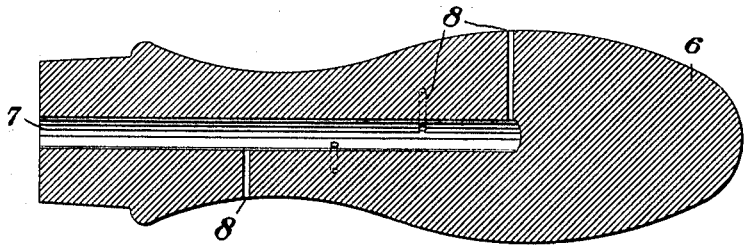
Figure 3:
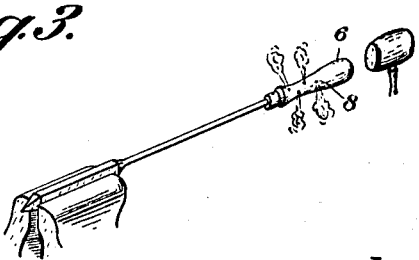

Figure 1 is a plan view of a handle adapted to be fitted to the tool. Fig. 2 is a longitudinal section of the handle. Fig. 3 is a perspective view illustrating the manner of applying the handle to the tool.

In attaching a handle according to my invention, the wooden handle 6 is first provided with a central longitudinal bore 7 extending partly through the same, of the requisite depth, but of smaller diameter than the tang to which it is to be applied. This bore is provided with one or more lateral vents 8 extending through the body of the handle, these vents being preferably quite small in diameter so as to not weaken the handle, and the respective vents are located in different cross-sectional planes, in order not to weaken the handle.

To fit the tool to such a handle, the tang is first heated to a bright red heat and is forced into the bore until it reaches the inner end thereof. It is then quickly withdrawn and allowed to cool, and is finally replaced in the handle where it will be confined at a tight fit. In placing the handle on the tang the tool may conveniently be held in a vise or the like, and the handle driven on by strokes of a mallet.

By providing several small vents, extending preferably only half way through the handle, to connect with the central bore, the handle is not weakened to any objectionable extent, and the vents permit the burned gases to escape, instead of trapping them in the bore, which might result in difficulty in driving the handle into place or, if the hot gases should escape around the tang, would cause the hole to be burned too large. It will be understood that the action of placing the heated tang in the handle, and attaching the same, must be done quickly, to avoid burning the hole too large, and the vents permit the rapidity necessary. The vents also have the further function, after the tang is in place, of ventilating the handle and so avoiding excessive heat thereof in the subsequent use of the tool, the method being particularly applicable, as above stated, to soldering tools and the like which are heated when in use. The ventilating action will tend to keep the tang cool by permitting a circulation of air through the vents.

The method proposed and described permits a red hot tang to be driven into a handle without weakening or bursting the handle, and also prevents subsequent bursting or burning of the handle incident to excessive heat when in use. After the red hot tang is driven in and quickly pulled out, it is allowed to cool as stated, and is then finally driven in permanently, and it will be found that the hole produced will be of proper size to securely hold the handle on the tool by frictional contact, without the necessity for additional fastenings.

What I claim as new and desire to secure by Letters Patent is:—

1. The method of attaching a handle to a tool, consisting in providing a handle of combustible material such as wood with a bore smaller in diameter than the tang of the tool to which it is to be applied, and with a vent extending from said bore to the exterior surface of the handle, forcing the heated tang of the tool into said bore, to enlarge the same by burning, quickly withdrawing the tang, and finally inserting the tang into the bore after it is cooled.

2. A combustible tool-handle having a bore to receive the tang of the tool, and also having an open vent extending from said bore to the side surface of the handle.

3. A combustible tool-handle having a bore to receive the tang of the tool, and also having a plurality of vents spaced apart along said bore and extending therefrom to the surface of the handle.

In testimony whereof, I do affix my signature in presence of two witnesses.

JAMES DONOGHUE.

Witnesses:
  JOHN A. BOMMHARDT,
  C. H. A. PALMER.

---

Copies of this patent may be obtained for five cents each, by addressing the " Commissioner of Patents, Washington, D. C."